United States Patent [19]

Frenkel et al.

[11] Patent Number: 5,182,941
[45] Date of Patent: Feb. 2, 1993

[54] METHOD OF LEAK DETECTION USING A RELEASABLE SURFACE FILM

[75] Inventors: Jeffry T. Frenkel, San Diego; Brent C. Anderson, Carlsbad, both of Calif.

[73] Assignee: Hughes Missile Systems Company, Los Angeles, Calif.

[21] Appl. No.: 828,047

[22] Filed: Jan. 30, 1992

[51] Int. Cl.[5] ............................................. G01M 3/12
[52] U.S. Cl. ........................................ 73/40; 73/49.1; 73/49.2
[58] Field of Search ............... 73/40, 45.5, 46, 49.2 T, 73/49.2 R, 49.1

[56] References Cited

U.S. PATENT DOCUMENTS

| | | | |
|---|---|---|---|
| 2,665,257 | 1/1954 | Potter | 73/40 |
| 3,203,229 | 8/1965 | Pevar | 73/40 |
| 3,326,035 | 6/1967 | Hirota et al. | 73/40 |
| 3,388,587 | 6/1968 | Hara et al. | 73/40 |
| 3,664,965 | 5/1972 | Hirota et al. | 73/40 |
| 4,002,055 | 1/1977 | Kops | 73/46 |

*Primary Examiner*—Hezron E. Williams
*Assistant Examiner*—Michael Brock
*Attorney, Agent, or Firm*—Charles D. Brown; Randall M. Heald; Wanda Denson-Low

[57] ABSTRACT

A method of detecting leaks through a surface using a flexible film releasably bonded to the surface. Surfaces of pressurized fluid holding structures having a large number of surface penetrations, such as rivets, tend to have problems with leaks. Leaks at these penetrations are detected by forming a continuous film, typically a polymer film over the surface of a closed structure, pressurizing the structure with a suitable fluid and detecting leaks by the bubbles that form in the film. Generally, the bubbles ar reaily apparent due to tint changes in the film areas no longer in contact with the structure surface. Bubbles are also easily detected by feel. The film is removed around bubbles and the leaking penetration is repaired. Those areas can again be coated with the film and the structure repressurized to detect any remaining leaks. This test can be repeated until all leaks are eliminated. The film is then stripped from the surface and the structure is ready for cleaning use or further processing.

13 Claims, 2 Drawing Sheets

METHOD OF LEAK DETECTION USING A RELEASABLE SURFACE FILM

BACKGROUND OF THE INVENTION

This invention relates in general to the detection of leaks through a structure surface and, more specifically to a leak detection method using a releasable film over the surface of a pressurized structure which detects leaks by the formation of bubbles in the film at leak locations.

Several different methods are in use for detecting leaks in pressure vessels, fuel tanks, and other vessels containing fluids. Most commonly, a gas filled pressurized vessel is checked for leaks by coating the surface with a soap solution that bubbles wherever the gas is leaking. While effective in many cases, this method has several disadvantages. Forming a uniform coating, with no dry spots, is often difficult. Very small, slow leaks often cannot be detected because of the length of time required for formation of a visible bubble and drying of the solution over that period. Soap solutions may contaminate or otherwise damage the surface being tested. Excellent operator skill, vision and patience are required for effective leak detection with soap solutions.

More recently, other leak detection systems have been developed, such as helium mass spectrometers, gas sniffers and ultrasonic detectors. While effective in most cases, these systems do not have the sensitivity to find very small leaks and are expensive and require considerable training and skill to use.

The prior methods require that the surface of the structure be marked at the leak locations for later repair. The marks may damage the surface, may be inadvertently wiped away prior to repair and large leaks may mask nearby smaller leaks.

Thus, there is a continuing need for improved leak detection methods that can find very small leaks, reliably and accurately, and permits easy and convenient retesting after initial repairs.

SUMMARY OF THE INVENTION

It is, therefore, an object of this invention to provide a leak detection method that overcomes the above-noted problems. Another object is to provide a method of leak detection that does not require elaborate and expensive equipment and highly trained personnel. A further object is to provide a method capable of detecting very small, slow, leaks. Another object is to provide a method which permits rapid and simple re-testing after repair of leaks found during initial testing.

The above-noted objects, and others, are accomplished in accordance with this invention by a method that basically comprises coating a clean structure surface with a releasable flexible film-forming material, pressurizing the interior of the structure, observing bubbles formed in the film by leaks, and stripping the coating around the bubbles to mark the leak locations and permitting repair.

After the leaks found during the initial test, the stripped areas can be recoated and the system repressurized to find any defective repairs and any other leaks that were very close to the originally found leaks. Finally, the coating is stripped away and the structure is ready for use or further manufacturing operations.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
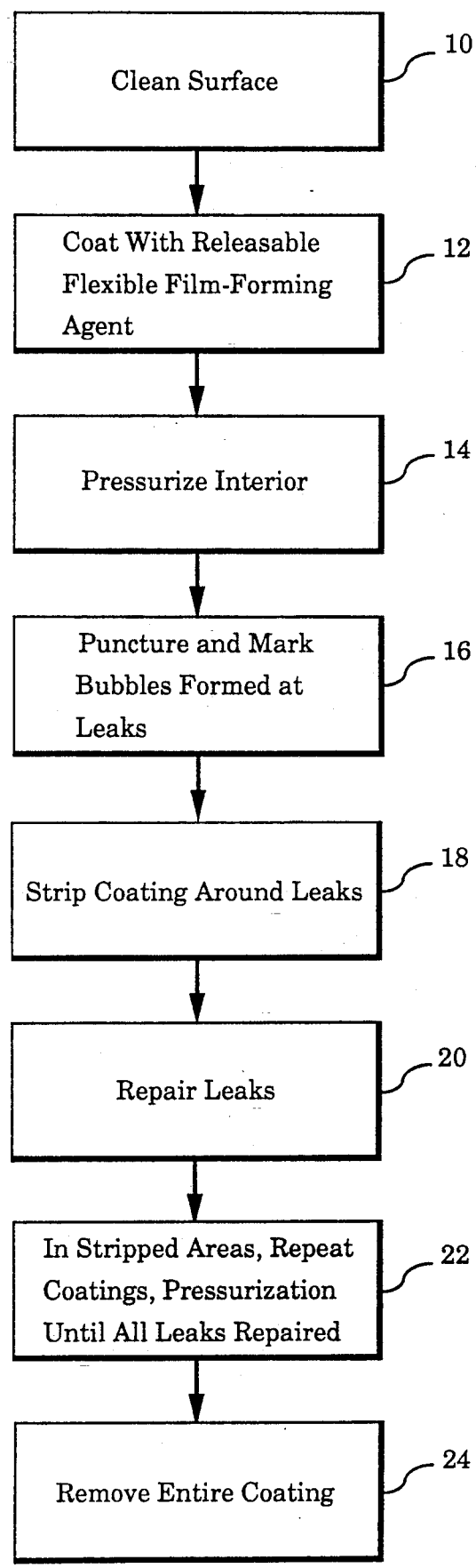
FIG. 1 is a block diagram of the steps in the method of this invention.

Referring now to FIG. 1, there is seen a block diagram illustrating the steps in a preferred overall method of detecting leaks.

Initially, the surface is cleaned, as indicated in block 10 to remove any surface contamination that might prevent the desired releasable bonding of the test film to the test surface. Any suitable cleaning agent that does not damage or otherwise adversely affect the surface may be used. Typical cleaning agents include Desoclean-20, available from DeSoto Point and Chemical company, 1,1,1-trichroroethane, isopropyl alcohol and methyl ethyl ketone.

The surface of the structure to be tested is then coated with a flexible, releasable film, as indicated in block 12. Any suitable film forming material that forms a tough flexible, elastic film that adheres well to the surface while being easily stripped without damage to the surface may be used. Typical film forming materials include poly vinyl chloride, poly vinyl alcohol and various rubber based materials. Poly vinyl chloride is preferred because of its fast drying solvents, low rate of gas diffusion and the film toughness, durability and transparency. These materials are conventionally formulated as release agents for molding applications. The material is mixed with a solvent for easy spray or brush application. Typically, the poly vinyl chloride and poly vinyl alcohol materials may be dissolved in an organic solvent such as methyl ethyl ketone or 1,1,1-trichloroethane. Others, such as many of the rubber based release agents may be water reduced. A film having a substantially uniform thickness in the range of about 2 to 10 mils is preferred for most effective bubble formation. The film forming material may be applied by any suitable method, such as spraying or brushing. High volume, low pressure spraying is preferred for maximum solids transfer with minimum solvent emissions. Preferably, a mixture of equal amounts by volume of poly vinyl chloride and methyl ethyl ketone is used.

The structure is then pressurized with a suitable gas to an appropriate pressure, as indicated in block 14. Any gas that does not adversely affect other components may be used. For convenience, air may be used, although nitrogen or an inert gas may be used if desired. The structure may be pressurized to any suitable pressure. Good results are obtained with pressures in the 10 to 40 psig range. Much higher pressures may deform or otherwise damage the structure, while much lower pressures tend to require excessive test time due to the low rate of leakage. The optimum pressure balancing these extremes is about 20 psig.

Larger leaks rapidly form bubbles under the film. The bubbles are punctured and the locations marked on the film, as indicated in block 16, to prevent excessive spread of the bubbles that might hide nearby small leaks. Any suitable marking means may be used, such as a felt tip marking pen. The bubbles cause a change in tint as the film lifts above the structure surface so that the surface color no longer shows through in the same way, so that most bubbles are readily visible. In some cases, small bubbles directly over rivet heads and the like may not be immediately visible. These are most easily detected by an operator running his fingers over the surface, feeling the raised bubbles much as one might read braille.

Pressurization and identification of bubbles may continue for any suitable time to assure that even extremely small leaks are detected. Generally, at the pressurization described above, all large leaks will be detected within one hour, while small leaks will be detected within about four hours. Extremely small leaks will be detected in about 18 hours. The sensitivity could reach as high as about $1 \times 10^{-6}$ atm sec/sec in detecting leaks.

The film around the identified leaks is then stripped away as indicated in block 18. The film may be conveniently cut away around each leak with a sharp blade, such as those sold under the "X-Acto" trademark. Any other suitable method for removing small areas of film at each bubble location may be used as desired.

The leaks are then repaired in any conventional manner as indicated in block 20. Rivets may be repaired or further compressed, sealing agents may be used, etc.

As indicated in block 22, once all observed leaks are repaired, the film coating is repaired by cutting away any bubbled, delaminated or damaged film areas, then recoating those areas with the film forming material as described above. Then, the leak detection cycle as described above is repeated to detect any leaks missed in the first test (e.g., where a large leak rapidly formed a large bubble that expanded over a small nearby leak) or that were not properly repaired or corrected. The pressurization, detection and repair cycle is repeated until no more leaks are found.

The entire film coating is then removed by stripping away the film, as indicated in block 24. The structure surface should be cleaned with a suitable solvent prior to finishing the surface. The structure is then ready for use or any desired painting or the like.

Figure 2:
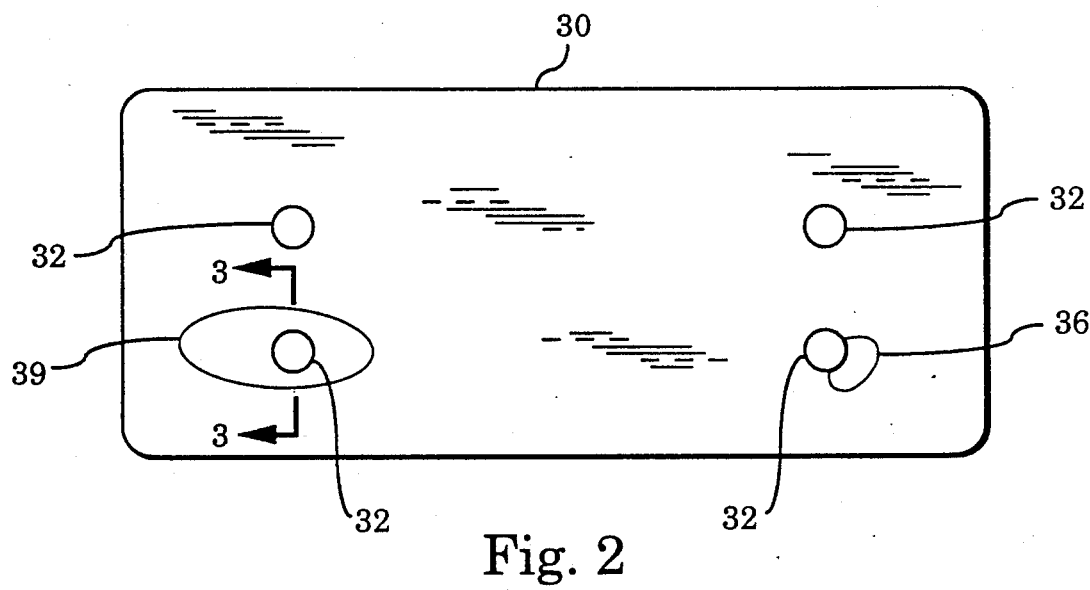
FIG. 2 is a plan view of a surface during test, showing bubbles formed by leaks.

A plan view of a small portion of a structure 30 is shown in FIG. 2, at the point in the process where the film coated structure has been pressurized. The structure has a painted, anodized or the like surface so that the unpainted rivet heads 32 are visible through the transparent or translucent film. Of course, in some cases, the structure surface and rivets or the like may be essentially the same color, so that the locations of rivets, fasteners, tubes or the like through the surface is not so obvious.

After pressurization begins, large leaks will fairly quickly form large bubbles 39. These bubbles are punctured before they expand to the point that the bubble might cover other rivets, making determination as to the actual leak location difficult and possibly hiding the location of smaller leaks. Very slow leaks will form smaller bubbles 36 over longer periods.

Figure 3:
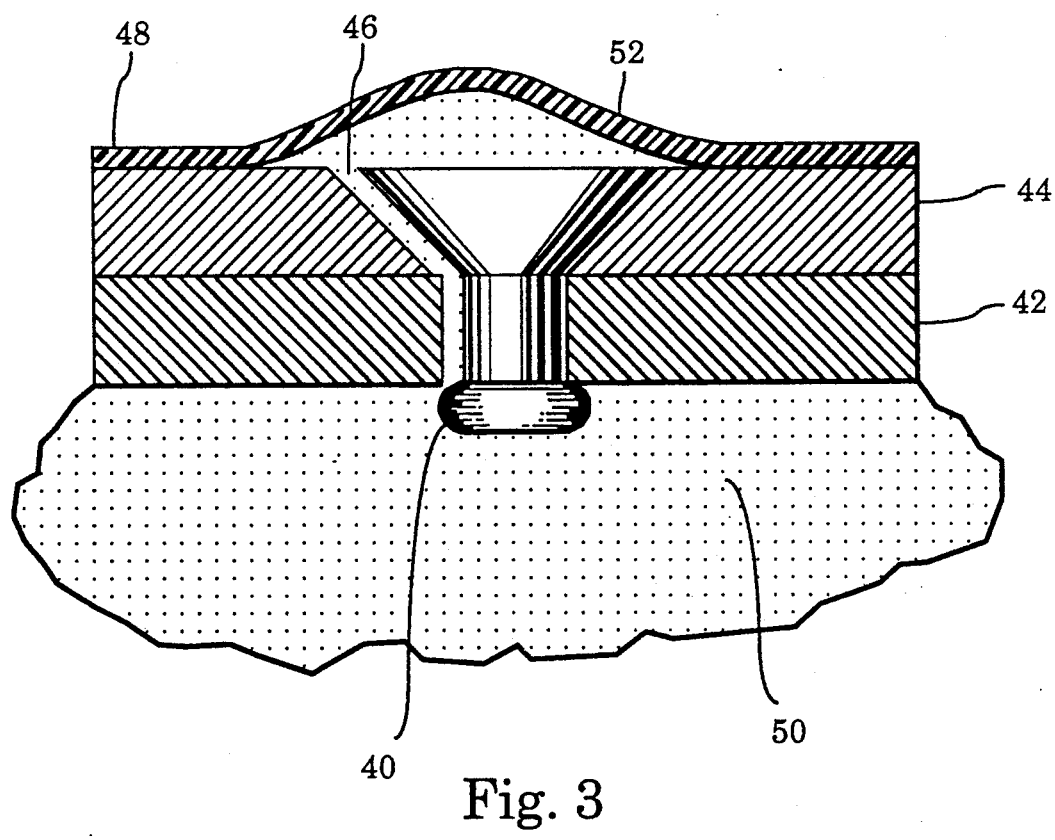
FIG. 3 is a section view taken on line 3—3 in FIG. 2.

A section through a small area of a riveted structure is shown in FIG. 3 after the film coating and pressurization steps. Here, a rivet 40 holds two structural metal sheets 42 and 44 together. A leakage path 46 (exaggerated for clarity) exists along rivet 40. The releasable flexible film 48 has been formed uniformly over the surface of sheet 44. As the structure interior is pressurized, the pressurizing gas 50 begins to leak along leakage path 46, forming a bubble 52 in film 48 which is both observed visually and by an operator who runs his fingers along the film surface and finds the bubbles by the sense of touch. After bubble 52 is punctured, marked such as by marking a circle around rivet 40 and the film 48 in the area of rivet 40 is removed, as detailed above, the leakage path 46 is eliminated by replacing rivet 40, further compressing that rivet or, possibly, by applying a sealant over the interior of the rivet and sheet 42. The film coating and test process is then repeated to assure that the leak has been properly repaired.

While certain specific materials, dimensions and arrangements have been specified in the above description of preferred embodiments, those may be varied, where suitable, with similar results. Other applications, variations and ramifications of this invention will occur to those skilled in the art upon reading this disclosure. Those are intended to be included within the scope of this invention, as defined in the appended claims.

We claim:

1. The method of detecting leaks through a surface which comprises the steps of:
    coating a clean first surface of a structure capable of being pressurized to be tested with a thin coating of a releasable flexible film forming material;
    curing said coating to a flexible film;
    applying a fluid under pressure to the opposite, second, surface of said structure;
    observing the formation of bubbles in said film indicative of fluid leaking through said structure to said first surface;
    puncturing said bubbles; and
    marking said film at the location of said bubbles after puncturing said bubbles.

2. The method according to claim 1 further including the steps of:
    trimming said film from an area surrounding each leak indicating mark;
    making repairs to eliminate the detected leak;
    recoating all trimmed areas with said film forming material;
    curing said material to a flexible releasable film;
    applying a fluid under pressure to the opposite, second surface of said structure;
    observing, visually or by touch, the formation of bubbles in said film indicative of fluid leaking through said structure to said first surface.

3. The method according to claim 2 further including the steps of:
    repeating the steps of claim 2 until no bubbles are observed over a selected period after said pressurization step; and
    stripping said film from said first surface.

4. The method according to claim 1 wherein said surface is thoroughly cleaned prior to the application of said film forming material.

5. The method according to claim 1 wherein said film forming material comprises a film forming agent selected from the group consisting of poly vinyl chloride, poly vinyl alcohol, rubber-based film formers and mixtures thereof, dissolved in a solvent.

6. The method according to claim 1 wherein said film forming material comprises substantially equal parts by volume of poly vinyl chloride and methyl ethyl ketone.

7. The method according to claim 1 wherein said structure capable of being pressurized is pressurized to a pressure of about 10 to 40 psig.

8. The method according to claim 1 wherein said bubbles are observed visually and by touch.

9. The method of detecting leaks through a surface which comprises the steps of:
   (a) coating a first surface of said structure capable of being pressurized to be tested with a thin coating of a releasable flexible film forming material;
   (b) curing said coating to a flexible film;
   (c) applying a fluid under pressure to the opposite, second, surface of said structure;
   (d) observing the formation of bubbles in said film indicative of fluid leaking through said structure to said first surface;
   (e) puncturing said bubbles;
   (f) marking said film at the location of said bubbles after puncturing said bubbles;
   (g) trimming said film from an area surrounding each leak indicating mark;
   (h) making repairs to eliminate the detected leak;
   (i) recoating all trimmed areas with said film forming material;
   (j) curing said material to a flexible releasable film;
   (k) applying a fluid under pressure to the opposite, second surface of said structure;
   (l) observing, visually or by touch, the formation of bubbles in said film indicative of fluid leaking through said structure to said first surface;
   (m) repeating steps (e) through (l) until no more bubbles are observed after a selected period of time; and
   (n) stripping said film from said first surface.

10. The method according to claim 9 wherein said surface is thoroughly cleaned prior to the application of said film forming material.

11. The method according to claim 9 wherein said film forming material comprises a film forming agent selected from the group consisting of poly vinyl chloride, poly vinyl alcohol, rubber-based film formers and mixtures thereof, dissolved in a solvent.

12. The method according to claim 9 wherein said film forming material comprises substantially equal parts by volume of poly vinyl chloride and methyl ethyl ketone.

13. The method according to claim 9 wherein said structure capable of being pressurized is pressurized to a pressure of about 10 to 40 psig.

* * * * *